United States Patent [19]
Hait

[11] Patent Number: 5,093,802
[45] Date of Patent: Mar. 3, 1992

[54] OPTICAL COMPUTING METHOD USING INTERFERENCE FRINGE COMPONENT REGIONS

[75] Inventor: John N. Hait, Missoula, Mont.

[73] Assignee: Rocky Mountain Research Center, Missoula, Mont.

[21] Appl. No.: 367,443

[22] Filed: Jun. 16, 1989

[51] Int. Cl.$^5$ .......................... G06G 7/00; G06E 1/04
[52] U.S. Cl. .................................. 364/807; 364/713; 359/1; 359/15; 359/108; 359/577
[58] Field of Search ............... 364/822, 837, 845, 807, 364/826, 713; 350/3.73, 3.72, 163, 162.11–162.24, 3.6

[56] References Cited

U.S. PATENT DOCUMENTS

| | | | |
|---|---|---|---|
| 4,084,880 | 4/1978 | Clow | 364/837 |
| 4,386,414 | 5/1983 | Case | 364/826 |
| 4,703,993 | 11/1987 | Hinton et al. | 364/822 |
| 4,764,889 | 8/1988 | Hinton et al. | 364/807 |
| 4,764,890 | 8/1988 | Hinton | 364/807 |
| 4,824,192 | 4/1989 | Roberts | 350/3.73 |
| 4,830,444 | 5/1989 | Cloonan et al. | 350/3.73 |

Primary Examiner—Jerry Smith
Assistant Examiner—Jim Trammell

[57] ABSTRACT

A fundamental method and apparatus for using wave-type energy, such as light, to provide: amplification, energy control, and logic functions including OR, EXCLUSIVE OR, and INVERTER; as well as: bistable information storage; computing; visual display; and dynamic imaging (where images are modified continually as computation proceeds) is disclosed. The method uses modulated input beams that are able to produce interference fringes, that are separated into constructive interference component regions and destructive interference component regions, to provide outputs from individual functions, that result from the interference which occurs in the separated interference-fringe component regions. Many basic functions are interconnected to produce more complex functions including complete digital and analog computers. Holograms made up of many subholograms are used to separate fringe component regions, and to direct function interconnecting beams.

20 Claims, 3 Drawing Sheets

OPTICAL COMPUTING METHOD USING INTERFERENCE FRINGE COMPONENT REGIONS

BACKGROUND OF THE INVENTION

1. Technical Field

This invention relates to optical computers, holographic computers, and basic optical logic functions.

2. Background Art

The state-of-the-art of optical computers is advancing rapidly. The high-speed switching capability inherent in optical logic methods, coupled with the high information densities of many optical information storage systems make the truly practical optical computer a worthy goal toward which many are pressing. The prior art includes many devices and methods, they are however, handicapped by several major problems . . . one is, the requirement that switching devices must be constructed of some special material. These devices are often called, "nonlinear optical devices" in patents such as AT&T's U.S. Pat. No. 4,764,890. The use of such specialized materials is both expensive and difficult to manufacture in comparison to the present invention.

Holograms have also been employed by many for storage of information, and the redirection of light beams connecting various optical switching devices to one another. However, the full capabilities inherent in holography have not been exploited. The present invention expands these capabilities to an extent far beyond prior use of simple interconnection.

Optical interference has also been used to some extent in the prior art, however the old methods do not separate the component parts of the interference fringe in the way that the present invention does. Instead, the interference fringe portions in the prior art are allowed to mingle together loosing their valuable logic and switching capabilities.

Prior art optical computers, disks and other data storage methods often used mechanical as well as electronic switching, scanning and data access means, along with the optics, adding the limitations inherent in mechanical and electronic methods. Therefore, a need was recognized for a completely optical logic system capable of providing all of the advantages of optics, while eliminating the problems of creating new materials, or amalgamating optics with other, less efficient, methods. Such a system is to be founded, not so much on the prior art, but rather, on the basic physics of light itself, using light in a fundamentally different manner.

SUMMARY OF THE INVENTION

The present invention uses a special optical method and apparatus that uses the fundamental laws of optical interference. This new optical logic system is then incorporated into special holograms. Because logic elements form a part of the holograms themselves, the output image from a logic-element-filled hologram varies continually as the logic action of computation proceeds. This is a new function called, "Dynamic Imaging." This dynamic output image from one hologram then becomes the input for another hologram. In turn, its dynamic image then becomes the interconnecting input for the first hologram. The result is a high-speed completely optical holographic computer.

Logic devices, both analog and digital, are the heart of data processing. Central processors, RAM and ROM memories, input and output devices including keyboards, sound-to-logic converters, visual displays, intercomputer communications and a host of data-processing-related items operate using Boolean logic functions such as the OR, EXCLUSIVE OR, INVERTER, FLIP-FLOP, etc. The present invention provides all of the computer logic functions using this basic new method.

Data is carried by means of coded light beams from one logic device to another, as well as input, and output for the new computer. In the simplest case, two such beams are combined so as to produce an optical interference fringe at the location where the logic function is to take place. The process of interference causes a spatial repositioning of the photons of the beams. As a result, two distinct types of regions within the fringe exist: that type of region where Constructive Interference (hereafter referred to as CI) occurs, and that type of region where Destructive Interference (hereafter referred to as DI) occurs. As a major feature of the present invention, these two types of regions are then separated by any convenient passive optical element. That type of region where CI occurs provides certain functions, and that type region where DI occurs produces others.

For clarity of understanding, these two types of regions are described as the "CI region", and the "DI region." These regions are defined by the fringe which is produced at the time when at least two input beams are on. The regions themselves are stationary, but the instantaneous amount of light that occurs in each region (once defined) varies in accord with the function underway. The designation is straight-forward when only two input beams are used. When multiple fringes are in use, the regions are defined, (for the sake of understanding) relative to the various light beam signals being used. But first let's examine a simple example device, which uses this method, having only two input beams, one CI region, and one DI region.

When the input beams are amplitude modulated with digital information, and the output beam, which is optically separated, comes only from a CI region of the interference fringe, the logical OR function results. When both input beams are off, clearly, there is able to be no output from the CI region of the logic device because there is no input, and the device is passive. If either, but only one of the beams is on, then the CI region is flooded with light which is now available for separation to become the output, even though no actual interference fringe is produced. When both beams are on, CI occurs at the position of the separating means, so light is again available for the output. The device, therefore, provides the logical OR function.

If one of the input beams of this CI region type device remains on during the time that the other beam is being modulated, a minimum level output will occur that represents the amount of light separated from the CI region when one beam is on and the other is off. If the modulated beam is on (even at a low level,) the result will be an amplification of the modulated signal because of the CI, which relocates the photons from both beams into the CI region, including photons that incident upon the adjacent DI region when no modulated signal is present. As a result, the device functions as an amplifier for both analog and digital signals.

The amount of amplification is able to be controlled by adjusting the level of the constant bias beam, the size of the means of separation, the number of CI regions used in the fully implemented device, and the ratio of DI area to CI area. Energy for amplification comes from the bias beam. When only the bias beam is on, no fringe exists, its energy is spread over the entire surface of the device, so only a small portion of the bias beam is output through the CI separator. When both beams are on, the fringe concentrates nearly all of the energy of both beams into the CI area. The amount of energy added to the beam is, as a result, especially related to the ratio of the DI area to the CI area. As a result, the output is considerably amplified although a small bias output still exists during the "off" portion of the signal. (This minimum "off" level output is able to be removed by a subsequent device as explained below.)

The EXCLUSIVE OR logic function is provided by separating the output from a DI region of the fringe. If both beams are off, there is no light to provide an output. If one beams is on, and the other off, then the DI REGION is flooded with light providing an output just as with the OR device, (because no actual interference is occurring). However, if both beams are on . . . DI will occur. Since the region separated for the output is only the DI region, no output will occur since the light from both beams has been spatially relocated into the CI regions which is not separated to be a part of this particular output. The example device using this method is, as a result, a logical EXCLUSIVE OR.

The INVERTER function is provided by separating the output from a DI region of the fringe, while keeping one of the input beams on, as a bias beam, during the time the other beam is being used to carry data. When the modulated beam is off, the output from the device is on because the bias beam is on, although interference does not take place. When the modulated beam is switched on, then DI occurs relocating the photons of both beams into the CI regions so that the DI separated output is off. As a result, the device is an inverter. The ratio of the DI area to the CI area will have a direct bearing on the output level, as will the input beam levels, providing a means of controlling the output signal quality. The device will work with both analog signals and digital signals, because the amount of spatial relocation of photons, within the fringe, is a function of the intensities of the two input beams.

Combination devices are able to be made by separating the CI regions for one set of outputs, and the DI regions for others. By providing multiple inputs, and by predetermining the phase of each, combinations of complex fringes are able to be created whereby a single separator is able to become CI region to some of the input beams, and DI region to others.

If one of the beams is phase or frequency modulated the devices become demodulators for both digital and analog signals because the variation of the data-carrying beams will cause the actual fringe to move back and forth across the separator varying the amplitude of the output beam.

Analog devices are able to add or subtract the individual inputs from the composite input, by specially selecting analog signal inputs and separating the output from the DI and CI regions as desired. An example is, a device for removing the constant light output from the AMPLIFIER described above. The amplifier's output beam is able to be directed to a DI device using a constant, low-level bias beam as the other input. The output is the amplified beam minus the low level constant portion of the signal.

Such analog devices are able to provide the logic functions for neurological and other analog parallel processing applications since the effect of multiple input beams, adjusted for level and phase, are able to be engineered to produce the desired collective output combination of CI and/or DI.

According to standard Boolean algebra, only two types of functions are required in order to produce all Boolean functions. As a result, by combining devices based on this method, all computer logic functions are able to be provided. Just as with their electronic counterparts. If an OR is connected into an INVERTER by directing the output beam of the first device into the input of the second device, the result is a NOR. Two INVERTERS and an OR can be used to make a NAND. If two NOR devices are connected together with the outputs of each driving the inputs of the other, the result is a FLIP-FLOP, the basic unit of binary data storage. If the light path coupling two NOR devices is delayed, the arrangement is able to be connected to become an oscillator. Multi-vibrators of all types are likewise able to be constructed. Read only memories, random access read/write memories, data processors, optical scanners, direct optical displays . . . every Boolean-based device used is now able to be constructed using this method.

Note: the basic physics of this method is not limited to the visible spectrum of light, but is able to function at any electro-magnetic wavelength, even though this discussion is related in familiar optical terms. In fact, this method is applicable to acoustical waves, subatomic particles in motion and any other wave-exhibiting energy form that is capable of being coded, directed, and is able to produce the needed interference.

The actual interference fringes are composed of many regions of both CI and DI. These are able to be separated off individually to provide multiple logic functions with multiple outputs for multiple connections to other logic devices, or they are able to be combined to provide stronger outputs. This fan out ability allows for the use of many more interconnecting beams between optical devices.

Any means that provides the needed separation of the CI regions of the fringes from the DI regions is acceptable as a part of the present invention. The separating means is able to be as simple as a mask with a hole in it. The hole being positioned to allow the light of only one region to pass. Optical elements of various types are able to be used such as a mirror that, by reason of its size and position, reflects light from one region and allows light in the other type of region to pass. But there is one unusual separation means that is of particular note . . . the hologram.

Holograms are able to redirect input light in a complex manner. Sub-hologram parts of the present invention become the logic devices themselves by redirecting the light from the DI and CI regions of an incoming fringe on to the next logic devices. This is able to be done by reflection so as to connect the devices to those of an adjacent hologram, or by transmission as in the case of output beams. They are able to control the input beams from other optical devices as well as the bias light needed to operate the entire arrangement. Complex holograms having many sub-holograms to perform both logic and logic interconnection functions are, a major feature of the present invention.

Combining all of the above mentioned components into a complete holographic computer system, requires: at least one complex hologram, and a means of redirecting the output image back into the hologram as an input image interconnecting the various devices. However for the sake of clarity of understanding, let's consider the case where two holograms are made to include multiple arrays of optical logic devices as part of the holograms, while the holograms are being held rigidly with respect to each other having a transparent material in between.

The main output image of each of the two holograms is directed, as the component-interconnecting input, into the other hologram. The total image of interconnecting beams from each hologram is, as a result, being altered continually by the built-in logic action as computation proceeds, a new function called: dynamic imaging.

At least one of the holograms has sub-hologram sections that direct light from an outside source into the logic array. At least one data output beam is provided along with at least one data input.

The energy or light source is able to be any wave-type energy form that is capable of producing the required interference, and is compatible with the particular holographic optical control abilities that are able to be added to sub-holograms, including monochromatic filtering, color separation, etc.

Holographic logic array types include read only memories, read/write random access memories, data processing arrays and input/output signal control arrays, among others. This method is an advancement over the prior art in that arrays of optical devices made of special materials are not required. The present invention permits the direct communication of one hologram to another, while performing the logic functions with sub-parts of the holograms positioned for CI and DI separation; a concept absent from the prior art. The result is a completely optical . . . holographic computer with the high-speed capabilities of optical switching, while utilizing the high-density information storage ability of holograms.

BRIEF DESCRIPTION OF THE DRAWINGS

The invention is able to be better understood upon examination of the following drawings along with the detailed description below. Please note, that the light beam angles and sizes are exaggerated so as to provide clarity of understanding.

FIG. 3 SIMPLE CI TYPE SEPARATING DEVICE. Depiction of a CI device which functions as an amplifier or a logical OR.

FIG. 4 SIMPLE DI TYPE SEPARATING DEVICE. Depiction of a DI device which functions as an inverter and a logical EXCLUSIVE OR.

DESCRIPTION OF THE PREFERRED EMBODIMENTS

Figure 1:
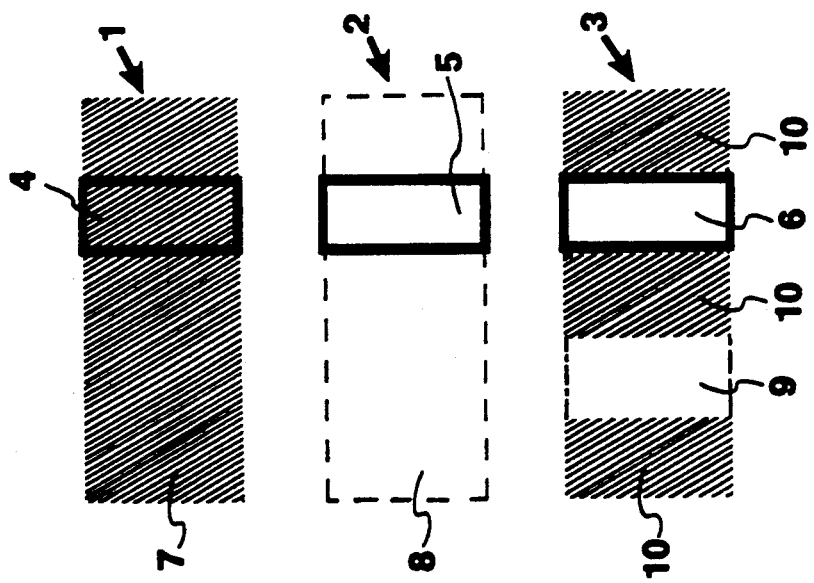
FIG. 1 CI LOGIC INTERFERENCE FRINGE. Depiction of CI fringe output separation for providing logic and light control.

Cross-hatch shading in the drawings, such as is depicted in FIG. 1 state (1), indicates darkness (the absence of light) over the entire cross-hatch area. Lighted areas are depicted without any cross-hatching such as in FIG. 1, state (2).

FIG. 1 depicts a typical CI device using this new method for providing logical and light control functions by separating at least one region of the full area delineated by an interference fringe. Three different states of the same two input beams are shown for a single device. State (3) depicts the area of a fringe when both input beams are on, and a fringe results. It is this state that determines the correct positions for the separating means (4), (5) and (6). The fringe produces two types of regions in the full fringe area: the dark regions, such as (10), which result from destructive interference (called DI), and the lighted regions, such as (6) and (9), which result from constructive interference (called CI).

The region being separated (6) remains stationary, and the two beams are modulated to produce the two other states. The two other states represent extremes in modulation, in the analog sense, providing 100% switching. When the method is used for analog signals then the outputs will vary between these extremes.

State (1) depicts the fringe area and the separated output when both beams are off. The entire area (7) delineated by the fringe in state (3) is dark. Thus, the output separated (4) is also dark, (off).

State (2) depicts the fringe area (8), and the separated output (5) when one beam is on, and the other beam is off. While no fringe actually exists in this state, the stationary separation means is lit providing the required, on, output.

State (3) depicts the condition when both input beams are on. The resulting fringe produces CI regions (6) and (9), along with DI regions marked (10). The separated output (6) is on.

When a CI device using this method is used for digital logic it is a logical OR.

The method depicted in FIG. 1 is able to function as an amplifier. If one beam is left on as a "bias beam," then state (1) is unable to occur. State (2) represents a minimum continuous output proportional to the area of the separated output (5). When the second beam is on, state (3) occurs. The output separated (6) is greater than output (5) because the CI redistributes the photons from the entire fringe area into the CI regions (6) and (9). The amount of amplification is able to be controlled by adjusting the fringe characteristics so as to change the area ratio between the CI (6) and DI (10) regions. The smaller the CI region is able to be made, in comparison to the DI region, the more amplification will result, because the output differential between fully on and fully off will be greater.

Any of the other CI regions such as (9) are able to be used as outputs by merely adding another separator. These outputs are able to be directed separately to separate devices or combined and directed to a single device. The separator is able to be constructed so that all of the CI regions are used at once. An example of such a separator is a transparent photographic positive of the fringe, which blocks the DI regions and allows the CI regions to pass light.

Figure 2:
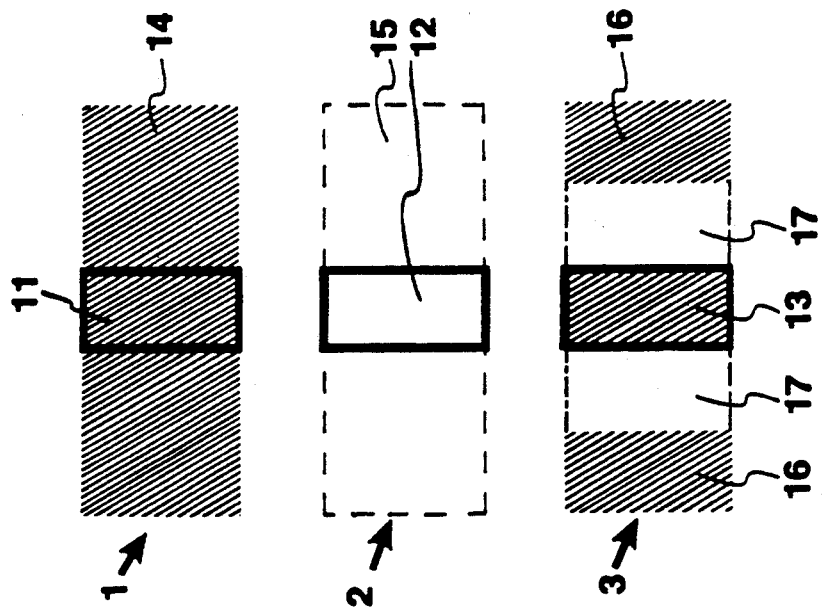
FIG. 2 DI LOGIC INTERFERENCE FRINGE. Depiction of DI fringe output separation for providing logic and light control.

FIG. 2 depicts a typical DI device using this new method for providing logical and output control functions by separating at least one DI region of the full area delineated by an interference fringe. Three different states using two input beams are shown for a single device. These states are the same as FIG. 1 (thus the same numbers) but the position of the separating means is different.

State (3) depicts the area of a fringe when both input beams are on, and a fringe results. It is this state that determines the correct positions for the separating means (11), (12) and (13). The fringe produces two types of regions in the full fringe area: the dark regions, such as (13) and (16), which result from destructive interference (DI), and the lighted regions, such as (17), which result from constructive interference (CI).

The region being separated (13) remains stationary, and the two beams are modulated to produce the two other states. The two other states represent extremes in modulation, providing 100% switching. When this method is used for analog signals, then the outputs will vary between these extremes.

State (1) depicts the condition when both input beams are off. The entire fringe area (14) is dark. As a result, no output is produced from the separating means (11).

State (2) depicts the condition when only one input beam is on. In this state, the entire fringe area (15) is flooded with light, although there is no actual fringe. The resulting output beam (12) is on.

State (3) depicts the condition when at least two beams are on. The result is the creation of the fringe over the entire area. The two types of regions are: the CI regions (17) which are on, and the DI regions (13) and (16) which are dark. The output from the separating means at (13) is, as a result, off . . . dark.

When used with digital signals, this DI method results in producing the EXCLUSIVE OR function.

When one of the signals in FIG. 2 remains on, then state (1) is unable to exist. The output will be that of state (2) from region (12). When the modulated beam is on, then state (3) occurs and the output at (13) goes dark . . . off. Thus this DI separating method results in producing the INVERTER function. Any of the other DI regions such as (16) are able to be used as outputs by merely adding another separator. These outputs are able to be directed separately to separate devices or combined and directed to a single device. The separator is able to be constructed so that all of the DI regions are used at once. An separator is able to be constructed so that all of the DI regions are used at once. An example of such a separator is a transparent photographic negative of the fringe, which blocks the CI regions, and allows the DI regions to pass lightly.

Any of the other DI regions, such as (16), are able to be separated as additional outputs, which are then able to be directed elsewhere. Since any optical element that is able to separate fringe component regions will work, a separator is able to be constructed so that all of the DI regions are used at once. And since the simplest form of a conventional hologram is just a photograph of an interference fringe, an example of a separator that uses more than one region is a photographic negative transparency of the fringe, which blocks the CI regions, and allows the DI regions to pass light.

Multiple digital and multiple analog signals are able to be processed using this same method as depicted in both FIGS. 1 and 2, including a combination device that has both CI and DI separating means. The outputs being a complex function of the input signals, their relative phases, and the ratio of areas being separated.

Figure 3:
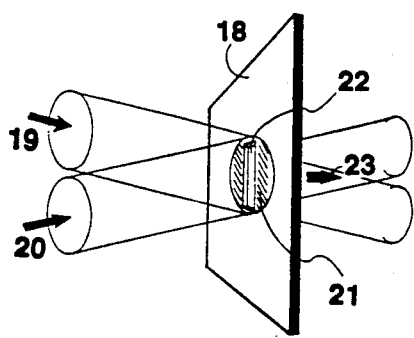

FIG. 3 depicts a simple device using the method of FIG. 1, using a CI region separator consisting of an optical element, in this case a mask (18), with input beams (19) and (20). Mask (18) inhibits the DI region (21) while passing light through the hole at the CI region (22), as in states (2) and (3) of FIG. 1. Output (23) functions like the output of FIG. 1. The state depicted is the same as state (3) of FIG. 1.

Figure 4:
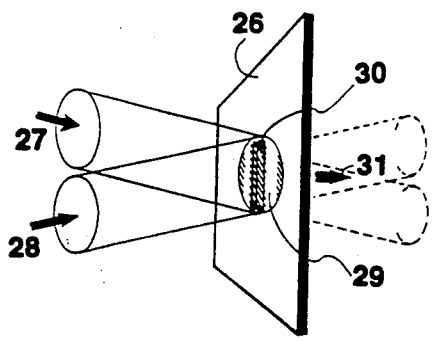

FIG. 4 depicts a simple device using the method of FIG. 2, using a DI region separator consisting of an optical element, in this case a mask (26), with input beams (27) and (28). Mask (26) inhibits the CI regions (29) while passing light through the hole at the DI region (30), as in state (2) of FIG. 2. Output (31) functions like the output of FIG. 2. The state depicted is the same as state (3) of FIG. 2.

This method is very versatile. The optical elements chosen to accomplish the needed regional separation are up to the designer. He is able to use any optical element or combination thereof that, by reason of its size and position relative to the fringe, provides the needed separation. This allows the designer to direct the output signals in any manner he wishes, using as much of or as little of the fringe area as he wishes.

Figure 5A:
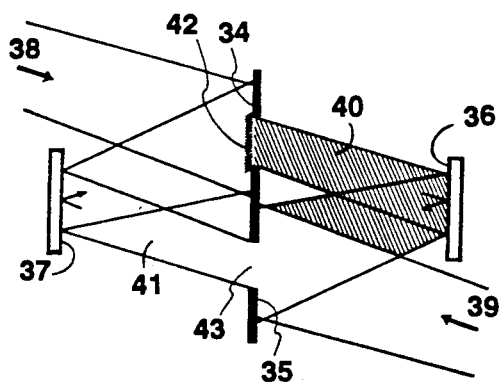
FIGS. 5A and 5B SIMPLE DI BISTABLE DEVICE. The connection of two optical logic inverters to produce a basic information storage element.
Figure 5B:
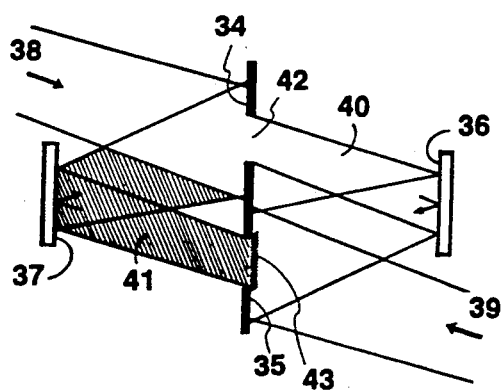

FIGS. 5A and 5B depict an application of this method by using a pair of inverter devices (like those of FIG. 4) to produce a bistable device. Two states are shown, state (A) FIG. 5A and state (B) FIG. 5B of the same device (thus the same numbers,) which is comprised of inverter (34) and inverter (35). Each has its own input bias beam: (38) for inverter (34), and (39) for inverter (35). Inverter (34) uses a mask as the separating means (shown in a sectional edge view), as does inverter (35). The output of each inverter is directed by means of an optical element, such as a mirror or reflecting hologram, to become the second inputs of the other inverter. The output of inverter (34) is shown as beam position (40), and the output of inverter (35) is shown as beam position (41).

As a result, output (40) is directed by optical element (36) to the input of inverter (35), and the output (41) is directed by optical element (37) to the input of inverter (34).

When in operation, the combination device is bistable. In state (A), FIG. 5A light from bias beam (39) passes through the mask of inverter (35), through the hole at position (43), to become output beam (41), which in turn, is directed by reflector (37) to become the input of inverter (34). The combination of bias beam (38) and output beam (41) produces an interference fringe with its DI at (42) on inverter (34). The mask of inverter (34) prevents the CI region from passing light through it. Its operation is like that of FIGS. 2 and 4. As a result, inverter (34) is in a state like that depicted in FIG. 2, state (3), so no light is available to output (40). Output (40) is dark, as a result, no interference fringe appears on inverter (35), and light continues to pass through at DI region (43) just as with FIG. 2, state (2).

State (B), FIG. 5B is the other bistable condition of FIG. 5B. It works just like state (A) except that now output (40) is on, creating a fringe on inverter (35) with its DI region at (43). As a result, output (41) is now dark, allowing light to pass through inverter (34).

The state of a bistable device created by this method is able to be set and reset by momentarily pulsing the bias beams individually off, or by adding additional inverter inputs that either create a fringe or remove a fringe as is needed to switch states.

Output from the composite device may be taken from any of the fringe regions as the designer wishes.

Figure 6A:
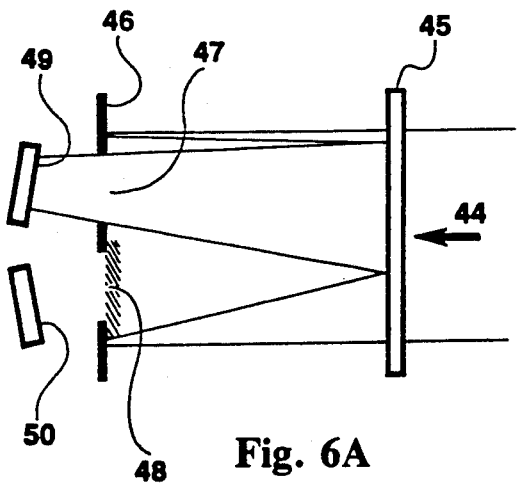
FIGS. 6A and 6B SIMPLE CI & DI BISTABLE DEVICE. The arrangement showing two separators which perform bistable function by moving the fringe.
Figure 6B:
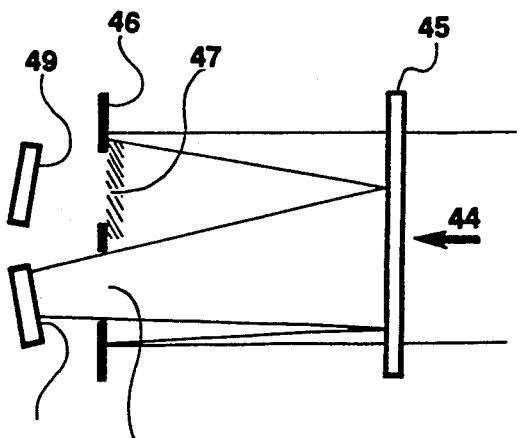

FIGS. 6A and 6B depict another bistable device using this method, and shown in the sectional edge view. In this case an input bias beam (44) passes through an optical element (45), such as a partially reflecting mirror or hologram. Mask (46) is the required separator having two holes at (47) and (48). Light passing through these separators is reflected back by reflecting holograms or mirrors (49) and (50).

State (A) FIG. 6A depicts one of the bistable states, and state (B), FIG. 6B the other, of the same device (thus the same numbers). In state (A), the reflected light from (49) is again reflected from (45) to form a fringe with the bias beam on the surface of separator (46). The components are arranged so that the CI portion of the fringe occurs at position (47) which amplifies the return beam from (49) just as in FIG. 1 state (3), providing a much brighter fringe than is able to occur in a non-amplified arrangement. The DI region of the fringe occurs at position (48) so that there is no output provided from the separator towards element (50) just as in FIG. 2 state (3).

State (B) is the other bistable state of FIG. 6B. In this case, the CI region of the fringe occurs at position (48), causing an output from the separator to be reflected from element (50), back to (45), and back to (46) to form the fringe along with the input bias beam (44). In this state, the DI region occurs at position (47) blocking any light from reaching element (49). As a result, the fringe moves from one position to the other depending on the state.

Outputs from the device are able to be taken from any of the unused fringe regions. The bistable states are able to be set and reset by pulsing the output beams to (49) or (50), by using additional devices, or by adding additional input beams that momentarily adjust the fringe position so as to align the fringe in the desired position needed to maintain the desired state.

Figure 7:
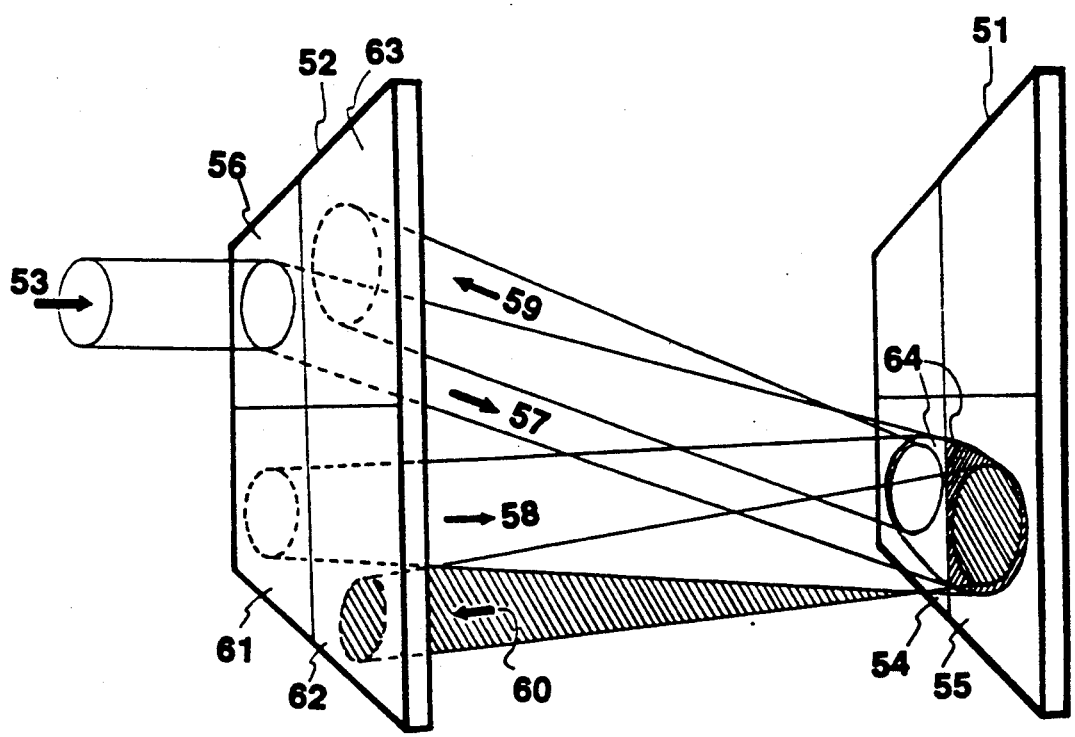
FIG. 7. HOLOGRAPHIC LOGIC DEVICE. The depiction of two sub-holograms used for CI and DI separation.

FIG. 7 depicts a typical application of this method using a hologram (51) which contains the separating means. A combination optical element (52) such as another hologram or group of optical elements, directs a beam from an outside light source (53), by means of sub-element (56), to become an input beam (57), onto the separator-containing sub-hologram parts (54) and (55). Sub-element (61) directs a modulated beam input (58), (from the output of another device not shown), also onto separating sub-holograms (54) and (55). A fringe is formed (64), during that time when both beams are in the on state, by beams (57) and (58) on separating sub-holograms (54) and (55). The state shown is the same as state (3) of both FIG. 1, and FIG. 2.

Sub-hologram (54) separates the CI portion of the fringe just as with FIG. 1 state (3), which is reflected as beam (59), to sub-element (63) for redirection elsewhere. Beam (60) is the output beam provided by separating sub-hologram (55), which is the DI output as in FIG. 2 state (3).

In this illustration, beam (60) is off, but during the other states, such as in state (2) of FIG. 2, beam (60) is on. This holographic application of the logic method provides both the CI type of device as in FIG. 1 for all three states, by means of sub-hologram (54), and the DI type of device as in FIG. 2 for all three states, by means of sub-hologram (55).

By adjusting the phase of the input beams, each of the sub-hologram separators are able to function as either CI or DI separators. This same arrangement will work with analog as well as digital signals, and with all of the logic and light control abilities of this invention.

The composite output image from hologram (51) changes depending on the state of the fringe and its relationship to the separating sub-holograms. As a result, the image is dynamic, changing continually as computation proceeds, which is the new function called: "dynamic imaging".

Figure 8:
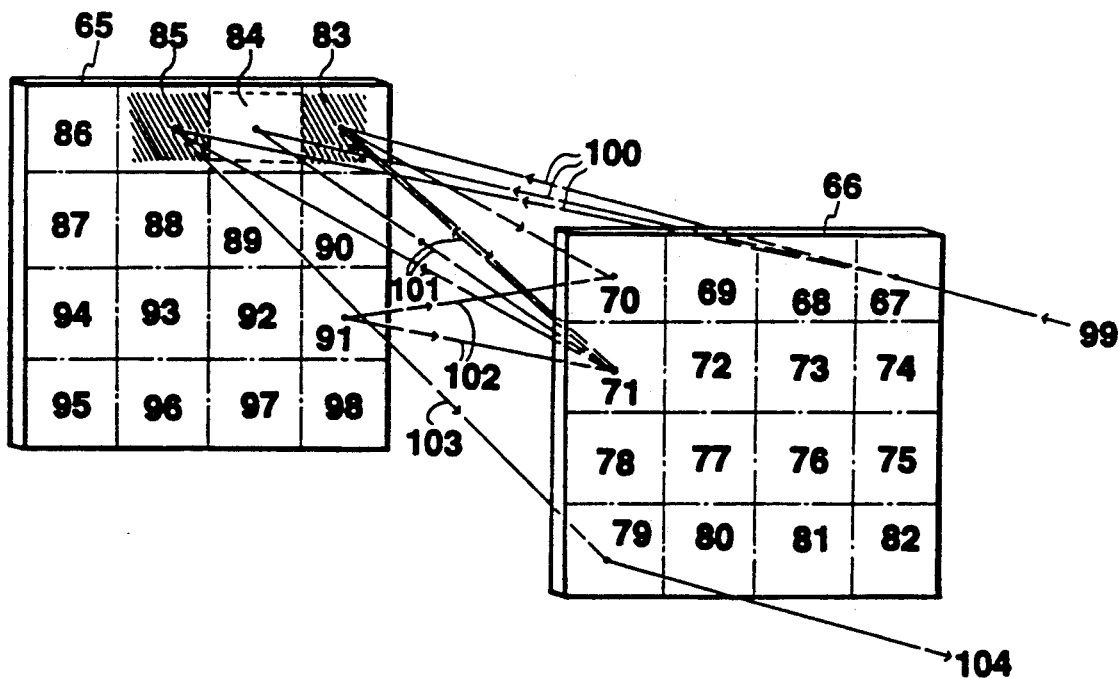
FIG. 8. HOLOGRAPHIC COMPUTER. The depiction of two holograms interconnected by dynamic images to provide holographic logic.

This dynamic image is able to be used to produce full functioning holographic computers, a small portion of which is depicted by FIG. 8. Two holograms are arranged so that the composite dynamic image of each one provides input to the other one. The dynamic image of hologram (65) is composed of the total of all output beams from hologram (65) which are directed toward hologram (66), and the dynamic image of hologram (66) is composed of the total of all output beams from hologram (66) directed toward hologram (65). [The total of all output beams which leave the arrangement, like (104) comprises another composite dynamic image.] In this embodiment of the invention, the inputs for each hologram-imbedded logic device are provided by the logic device outputs from the other hologram. This is a distinct technological advancement over the prior art in which individual logic devices, made from special materials rather than holograms, are merely interconnected by holographic-directed beams. Whereas, the present invention simply interconnects a number of holograms, having built-in logic devices.

The prior art is also not really dynamic imaging, because the logic devices in the old manner resided outside of the holograms, and all image changes were the result of the outside switching functions, whereas the present invention provides for the continual modification of the dynamic images by the holographic built-in logic. This method is particularly useful when a dynamic image is to be created as a visual display by allowing selected beams to exit one of the holograms, as with (104). These many uses are made possible by the great versatility of this interference-based holographic method.

The portion of a holographic computer pictured in FIG. 8 depicts a flip-flop bistable device similar to the one shown in FIGS. 5A and 5B only using holograms with imbedded logic devices, this composite device was chosen so as to facilitate understanding the basic method. Hologram (65) is divided into sub-holograms (83) through (98), and hologram (66) is divided into sub-holograms (67) through (82). Some of these sub-holograms are imbedded logic devices, and others are used to interconnect logic devices, provide input and output connection, as well as directing the input bias beams as needed.

Input beam (99) is a bias beam that is directed by sub-hologram (68) to cover the three sub-holograms (83), (84), and (85) which form the first inverter of this bistable composite device. The three lines marked (100) simply show that the output from sub-hologram (67) is directed to cover all three sub-holograms (83) through (85). These three sub-holograms have another input which comes from sub-hologram (71), and is marked by the three lines (101). Together these two inputs produce an interference fringe on the three sub-holograms (83) through (85).

The DI portions of the fringe are shown by the cross-hatch shading on sub-holograms (83) and (85). This fringe, provides the inverter function just as in FIG. 2, and is shown with the full fringe just as in FIG. 2 State (3). The CI region of the fringe occurs on sub-hologram (84). The DI region of the fringe on sub-hologram (85) is used to provide an output from the composite bistable device by beam (103), which is directed elsewhere by sub-hologram (79). Sub-hologram (79) provides an output (104). Since a hologram is able to be transparent or reflective, the beams are able to be directed at will.

Since the ability to separate component regions of an interference fringe, as required by the present invention, is not limited by the wavelength of the wave-type energy used, the operational wavelengths are able to be selected from the visual range of the electro-magnetic spectrum. Then a group of multiple outputs such as (104) are able to function as a direct visual display output. By using multiple wavelengths, simultaneously or in rapid succession, the multiple outputs are able to function as a full color visual display. Or, by modulating an output beam such as (104) and redirecting it to become an input to one of the other sub-holograms, the arrangement is able to easily input data from a large number of possible modulating devices, while maintaining the wave phasing required for the production of interference fringes.

To continue the explanation of the bistable nature of the example hologram-imbedded logic devices, Sub-holograms (70) and (71) form the second inverter used to make the flip-flop. The input beams for it (102) come from sub-hologram (91), which is part of another device (other interconnections not shown) that provides bias to (70) and (71). The fringe for this second inverter appears on sub-holograms (70) and (71) during the other (not-depicted) bistable state. The state of this second inverter is like that of FIG. 2 state (2). As a result, the position of the fringe effectively moves from sub-holograms (83), (84) and (85) to (70) and (71) and back depending upon the current bistable state.

The many other sub-holograms are likewise able to be interconnected by the respective dynamic images producing full optical logic arrays, including analog as well as digital processors for signals as well as data.

As a result, by this method, with very many such optical devices, and even many holograms, completely optical holographic computers, computer peripherals, and a host of other optical devices are able to be constructed.

What is claimed is:

1. A method of performing logic, energy control and amplification functions comprising the steps of: producing a plurality of input wave-type beams modulated with encoded information; producing interference fringes with said plurality of input beams; separating said interference fringes into constructive and destructive component regions of at least one interference-fringe to provide at least one output where said function is to take place; wherein said function is based on the constructive and destructive interference of said input beams located in said constructive and destructive component regions.

2. The method claimed in claim 1 for performing the logical OR function, further comprising digital coding of said input beams, and separating of at least one constructive interference component region to provide at least one output.

3. The method claimed in claim 1 for performing a combination of energy-control, logic and amplification functions, further comprised of: separating of at least one constructive interference component region, and at least one destructive interference component region to provide at least one combined output.

4. The method claimed in claim 1 for performing the amplification function, further comprising: of said input beams, at least one modulated input beam, and at least one other input beam being maintained at a constant level (not zero), and separating of at least one constructive interference component region to provide at least one output.

5. The method as claimed in claim 1 for performing the logical EXCLUSIVE OR function, further comprising digital coding of said input beams, and separating of at least one destructive interference component region to provide at least one output.

6. The method as claimed in claim 1 for performing the INVERTER function, further comprising: of said input beams, at least one modulated input beam, and at least one other input beam being maintained at a constant level (not zero), and separating of at least one destructive interference component region to provide at least one output.

7. The method as claimed in claim 1 for performing composite functions from a plurality of said logic, energy control and amplification functions, further comprising the additional step of: interconnecting a plurality of said functions, by directing separated interference-fringe component region output beams from individual function locations, to provide inputs for other said functions at other individual function locations, to provide composite functions.

8. The method as claimed in claim 7 for performing computer functions, further comprising the additional step of: producing at least one information encoded input beam to at least one of said individual function locations, and at least one information encoded output beam from at least one other of said individual function locations, to provide input to and output from said interconnected plurality of logic, energy control and amplification functions.

9. The method as claimed in claim 8 for performing the dynamic imaging function, further comprising the additional step of: providing a plurality of individual function output beams from a plurality of interference-fringe component regions, directed to form and provide at least one composite output image; wherein said image is dynamically modified by the composite computational action of said plurality of interconnected functions.

10. The method as claimed in claim 9 for performing a visual display function, further comprising the additional step of: producing said input wave-type energy in the visible portion of the electro-magnetic spectrum, to provide a visible image output.

11. The method as claimed in claim 8 for performing holographic interference-fringe component region separation and function output beam direction, further comprising the additional step of: locating and sizing at least one sub-hologram, of at least one hologram, to direct wave-type energy from at least one interference-fringe component region to produce at least one output.

12. A method of performing bistable information storage, comprising the steps of: producing a first plurality of input wave-type beams modulated with encoded information; producing interference fringes with said first plurality of input beams; separating said first interference fringes into constructive and destructive component regions of at least one first interference-fringe to provide at least one first output from at least one first destructive interference component region; wherein said first output is based on the constructive and destructive interference of said first input beams located in said first destructive component region;

producing a second plurality of input wave-type beams modulated with encoded information; producing interference fringes with said second plurality of input beams; separating said second interference fringes into constructive and destructive component regions of at least one second interference-fringe to produce at least one second output from at least one destructive interference component region; wherein said second output is based on the constructive and destructive interference of said second input beams located in said second destructive component region;

directing said first output to provide at least one input of said second plurality of inputs; directing said second output to provide at least one of said first inputs; wherein said first output remains low while said second output remains high in one bistable state, and said first output remains high while said second output remains low in the other bistable state;

producing at least one other output from at least one of said interference-fringe component regions to provide bistable information output; wherein the bistable state is set or reset by said other inputs to said first and second plurality of input beams.

13. A method of performing bistable information storage, comprising the steps of: producing a first plurality of input wave-type beams modulated with encoded information; producing interference fringes with said first plurality of input beams; separating said first interference fringes into constructive and destructive component regions of at least one first interference-fringe to provide at least one first output; wherein said first output is based on the constructive and destructive interference of said first input beams located in said first constructive and destructive component regions;

producing a second plurality of input wave-type beams modulated with encoded information; producing interference fringes with said second plurality of input beams; separating said second interference fringes into constructive and destructive component regions of at least one second interference-fringe to produce at least one second output; wherein said second output is based on the constructive and destructive interference of said second input beams located in said second constructive and destructive component regions;

directing said first output to provide at least one input of said second plurality of inputs; directing said second output to provide at least one of said first inputs;

locating said first and second separation locations, such that, at least one of said second constructive interference component regions overlaps the location of at least one of said first destructive interference component regions, and at least one of said second destructive interference component regions overlaps the location of at least one of said first constructive interference component regions;

wherein, said first output is separated from at least one constructive interference region of said first interference-fringe, and said second output is separated from least one destructive interference component region of said first interference-fringe to provide the first bistable state, wherein said first output is high and said second output is low;

and wherein, said second output is separated from at least one constructive interference component region of said second interference-fringe, and said first output is separated from least one destructive interference region of said second interference-fringe to provide the second bistable state, wherein said first output is low and said second output is high.

producing at least one other output from at least one of said interference-fringe component regions to provide bistable information output; wherein the bistable state is set or reset by said other inputs to said first and second plurality of input beams.

14. An apparatus for performing logic, energy control and amplification functions comprised of: means for producing a plurality of input wave-type beams modulated with encoded information; interference fringes produced by said plurality of input beams; means for separating said interference fringes into constructive and destructive component regions of at least one interference-fringe to provide at least one output where said function is to take place; wherein said function is based on the constructive and destructive interference of said input beams located in said constructive and destructive component regions.

15. An apparatus as claimed in claim 14 for performing the logical OR function, further comprised of: digital coding of said input beams, and said separating means separating at least one constructive interference component region to provide at least one output.

16. An apparatus as claimed in claim 14 for performing the amplification function, further comprising: of said input beams, at least one modulated input beam, and at least one other input beam being maintained at a constant level (not zero), and said separating means separating at least one constructive interference component region to provide at least one output.

17. An apparatus as claimed in claim 14 for performing the logical EXCLUSIVE OR function, further comprising digital coding of said input beams, and said separating means separating at least one destructive interference component region to provide at least one output.

18. An apparatus as claimed in claim 14 for performing the INVERTER function, further comprising: of said input beams, at least one modulated input beam, and at least one other input beam being maintained at a constant level (not zero), and said separating means separating at least one destructive interference component region to provide at least one output.

19. An apparatus as claimed in claim 14 for computing using a plurality of said logic, energy control and amplification functions, further comprised of: a directing means for interconnecting a plurality of said functions, by directing separated interference-fringe component region output beams from individual function locations, to provide inputs for other said functions at other individual function locations; at least one of said input beams being held at a constant level (not zero); at least one information encoded input beam to at least one of said individual function locations, and at least one information encoded output beam from at least one other of said individual function locations, to provide input to and output from said interconnected plurality of logic, energy control and amplification function locations.

20. An apparatus as claimed in claim 19 for performing the dynamic imaging function and visual display function, further comprised of: said input wave-type energy being in the visible portion of the electro-magnetic spectrum; a plurality of said individual function output beams from a plurality of interference-fringe component regions; at least one beam directing means to form and provide at least one composite output image; wherein said image is dynamically modified by the composite computational action of said plurality of interconnected functions.

* * * * *